May 3, 1927.
B. H. SMITH
1,626,978
LUGGAGE CARRIER
Filed March 1, 1926
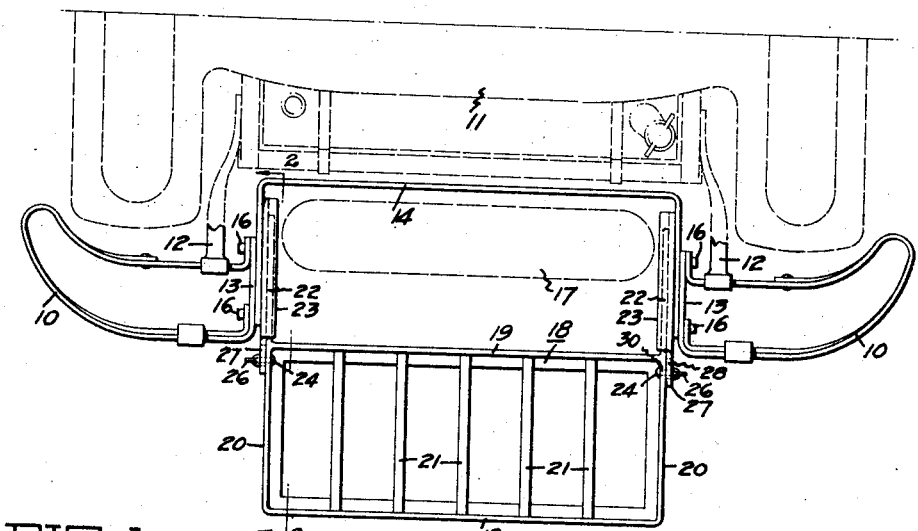
FIG_1.
FIG_2.
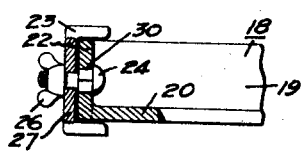
FIG_3.
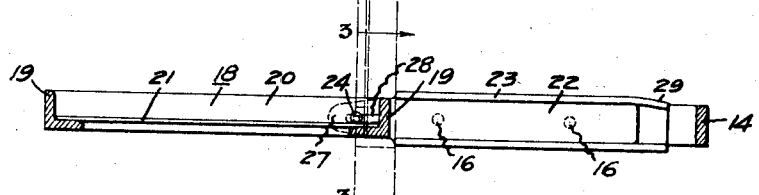
FIG_4.
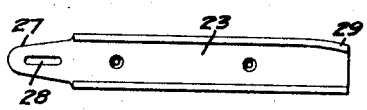
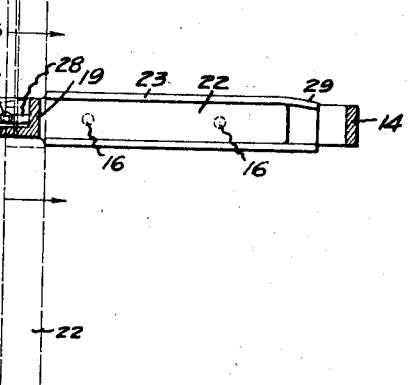
INVENTOR
Bryan H. Smith.
BY White Frost
his ATTORNEYS Patented May 3, 1927.

1,626,978

UNITED STATES PATENT OFFICE.

BRYAN H. SMITH, OF BERKELEY, CALIFORNIA.

LUGGAGE CARRIER.

Application filed March 1, 1926. Serial No. 91,326.

This invention relates to devices adapted to be attached to automobiles or other vehicles for the carrying of luggage and which are known as luggage carriers.

A variety of luggage carriers are in use at present, one common type being a rack which is hinged across the back of an automobile in such a manner that it may be folded up when not in use. However, when a wing type of rear bumpers is employed on an automobile such a carrier interferes with the removal of the spare tire which is normally positioned between the side wings.

It is an object of this invention to devise a combined automobile luggage carrier and wing type of bumper which will permit ready access to the spare tire.

It is a further object of this invention to devise a luggage carrier which is adapted to be entirely removed from an automobile.

It is a further object of this invention to devise a luggage carrier which is adapted to be detachably secured to a wing type of automobile bumper.

It is a further object of this invention to devise a novel form of attaching means for securing a luggage carrier to a wing type of bumper.

Further objects of this invention will appear from the following description in which I have set forth the preferred embodiment of my invention.

Referring to the drawings:

Figure 1 is a plan view showing the luggage carrier attached to a wing type of automobile bumper.

Fig. 2 is a detail cross sectional view taken along the line 2—2 of Fig. 1.

Fig. 3 is a cross sectional detail view taken along the line 4—4 of Fig. 1.

Fig. 4 is a detail view of the channel members for engaging the rack.

The bumper has been shown in Fig. 1 as applied to a wing type of bumper comprising generally a pair of side wings 10 which are suitably secured to the rear of an automobile or other vehicle 11 by means of a pair of brackets 12. These side wings are constructed of a plurality of spring steel bars which are adapted to absorb impacts and are provided with opposed inner ends 13 which are interconnected by means of a U-shaped reinforcing bar 14. Suitable means such as bolts 16 serve to secure together the opposed ends of the side wings and the U-shaped reinforcing member. The space between the opposed ends of the side wings is usually occupied by a rack which supports a spare tire 17.

A luggage rack 18 is provided which in the particular form illustrated comprises a pair of side rails 19 interconnected by a pair of end rails 20 and a plurality of intermediate cross bars 21. Projecting from one side of this rack adjacent the ends thereof are the extension bars 22 which slidably engage a pair of channel members 23. These channel members may be made of either cast or pressed steel or other suitable metal and are preferably secured to the opposed ends 13 of the bumper wings as by means of the bolts 16. Any suitable means may be employed for retaining the extension bars 22 in engagement with the channel members 23 but for simplicity it is preferable to merely provide a pair of bolts 24 provided with wing nuts 26. To receive the securing bolts 24 each of the channel members 22 has its web extended at one end thereof to form a projecting portion 27 which is provided with a slot 28. Each of the end rails 20 is provided with a non-circular aperture 30 adapted to receive the squared head of the bolt 24. In order to prevent rattling of the luggage rack the channels 23 are preferably tapered as at 29 so that the extension bars 22 may be jammed into this tapered portion before tightening the bolts 24. The function of the slot 28 is to provide a certain amount of limited movement between the extension bars 22 and the channel members 23 so that these bars may be forced into the tapered portion before tightening the wing nuts 26.

With the luggage carrier above described the entire rack may be removed from the automobile when not in use or in order to obtain access to the spare tire 17. Furthermore, the rack is carried in a folded position merely by removing it from engagement with the channels 23 and inserting the bolts 24 with the rack in vertical position as shown by the dotted lines in Fig. 2. Because of the absence of hinged joints or connecting links the device may be cheaply manufactured and will not rattle when in use.

I claim:

1. In a luggage carrier, a luggage rack, means for permitting shifting of the rack in a horizontal plane, and means permitting pivotal movement of the rack about a horizontal axis.

2. A luggage carrier comprising a luggage rack, and means for slidably securing said rack between a pair of fender bumpers of an automobile.

3. A luggage carrier comprising a luggage rack, and means for slidably and pivotally securing said rack between a pair of fender bumpers of an automobile.

4. A combined luggage carrier and bumper comprising a pair of side impact wings adapted to be secured to an automobile, said wings having inner opposed ends, a pair of channel members secured to said opposed ends, a luggage rack, a pair of extension bars on said rack adapted to slidably engage said channel members, and means for locking said bars in engagement with said channel members.

5. A combined luggage carrier and bumper comprising a pair of side impact wings adapted to be secured to an automobile, said wings having inner opposed ends, a pair of tapered channel members secured to said opposed ends, a luggage rack, a pair of extension bars on said rack adapted to slidably engage and be wedged in said channel members, and bolts for locking said bars in engagement with said channel members.

6. A luggage carrier adapted to be associated with a bumper of the wing type in which the side bumpers are provided with opposed inner end portions, said carrier comprising a rack having lateral extensions adjacent its ends, and means for slidably securing said extensions to said end portions.

7. A luggage carrier adapted to be associated with a bumper of the wing type in which the side bumpers are provided with opposed inner end portions, said carrier comprising a rack, and means for slidably securing said rack to said end portions.

8. A luggage carrier adapted to be associated with a bumper of the wing type in which the side bumpers are provided with opposed inner end portions, said carrier comprising a rack, and means for slidably and pivotally securing the ends of said rack to the said end portions.

9. A luggage carrier comprising a rack having lateral extensions, a pair of members secured to an automobile into which said extensions may be wedged, and means for retaining said extensions in engagement with said members.

10. A combined luggage carrier and bumper comprising a pair of side wings adapted to be secured to an automobile, said wings having inner opposed ends, a U-shaped bar interconnecting said opposed ends, a rack having extensions projecting laterally from one side thereof, and means secured to said opposed wing ends to detachably engage said extensions.

11. In a luggage carrier adapted to be secured to an automobile, means for permitting pivotal movement of the rack about a horizontal axis from an operative position to a folded position, and means for permitting shifting of the rack in a general horizontal direction for locking the same in operative position.

In testimony whereof, I have hereunto set my hand.

BRYAN H. SMITH.